United States Patent
Monier

Patent Number: 5,912,904
Date of Patent: Jun. 15, 1999

[54] METHOD FOR THE PRODUCTION OF AN ERROR CORRECTION PARAMETER ASSOCIATED WITH THE IMPLEMENTATION OF MODULAR OPERATIONS ACCORDING TO THE MONTGOMERY METHOD

[75] Inventor: Guy Monier, Les Brets, France

[73] Assignee: SGS-Thomson Microelectronics S.A., Saint Genis, France

[21] Appl. No.: 08/779,527

[22] Filed: Jan. 7, 1997

[30] Foreign Application Priority Data

Jan. 18, 1996 [FR] France ................. 96 00692

[51] Int. Cl.⁶ .............................. G06F 11/10; G06F 7/72
[52] U.S. Cl. .......................................... 371/37.07; 364/746
[58] Field of Search ..................... 371/37.07; 364/746, 364/746.1

[56] References Cited

U.S. PATENT DOCUMENTS 5,513,133  4/1996  Cressel et al. ................ 364/746 X
5,764,554  6/1998  Monier ............................ 364/746

FOREIGN PATENT DOCUMENTS

A-0 601 907  6/1994  European Pat. Off. .......... G06F 7/72

OTHER PUBLICATIONS

French Search Report from French Patent Application 96 00692, filed Jan. 18, 1996.

IEEE Journal on Selected Areas in Communications, vol. 11, No. 5, Jun. 1, 1993, pp. 761–769, Arazi, B. "Double–Precision Modular Multiplication Based on a Single–Precision Modular Multiplier and a Standard CPU".

*Primary Examiner*—Phung M. Chung
*Attorney, Agent, or Firm*—Wolf, Greenfield & Sacks, P.C.

[57] ABSTRACT

Disclosed is a method for producing a binary error correction parameter $H=2^{(m1+m2)*k} \bmod N$ by means of a coprocessor having registers with at most m*k bits, N being a binary data element encoded on m1 words of k bits, m1 being an integer greater than m, m, m2 and k being non-zero integers, the coprocessor including a first register, a register, a third register and a fourth register, a subtraction circuit and comparison circuitry. The disclosure thus proposes a circuit and a method specially suited to the required computation without excessively increasing the size of the coprocessor.

24 Claims, 3 Drawing Sheets

METHOD FOR THE PRODUCTION OF AN ERROR CORRECTION PARAMETER ASSOCIATED WITH THE IMPLEMENTATION OF MODULAR OPERATIONS ACCORDING TO THE MONTGOMERY METHOD

BACKGROUND OF THE INVENTION

1. Field of the Invention

The invention relates to a method for the production of an error correction parameter associated with the implementation of modular operations according to the Montgomery method. This method enables the performance of modular computations in a finite field (or Galois field) denoted $GF(2^n)$ without the performance of divisions.

2. Discussion of the Related Art

Conventionally, modular operations on $GF(2^n)$ are used in cryptography for applications such as the authentication of messages, the identification of a user and the exchange of keys. Such exemplary applications are described for example in the French patent application published under No. 2 679 054.

Figure 1:
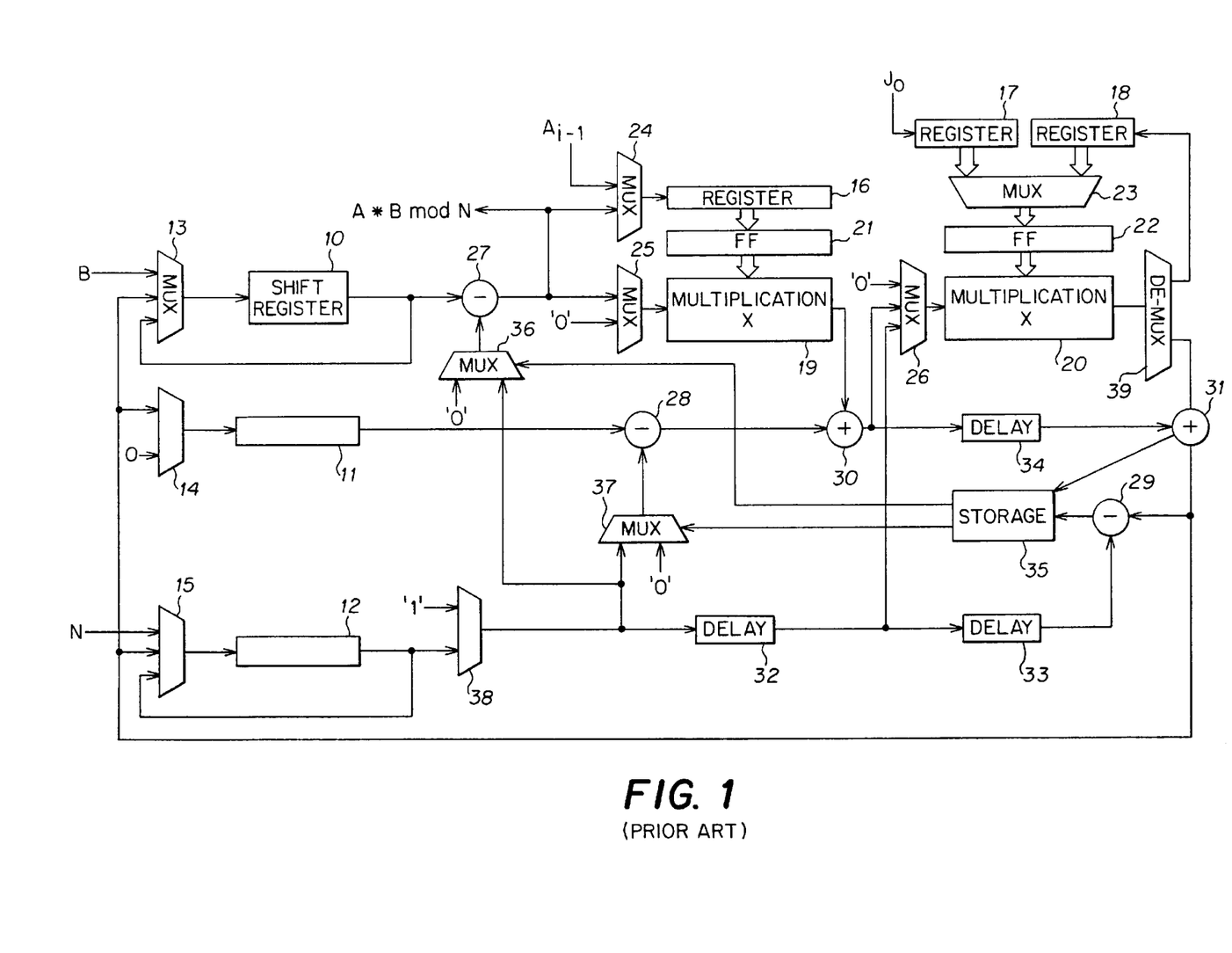
FIG. 1 shows a prior art coprocessor.

There are commercially available integrated circuits dedicated to such applications. These include, for example the product referenced ST16CF54 manufactured by SGS-THOMSON MICROELECTRONICS S.A., built around an association of the type comprising a central processing unit and an arithmetic coprocessor and dedicated to the performance of modular computations. The coprocessor used enables the processing of modular operations by the use of the Montgomery method. It is the object of a European patent application filed under the reference No. 0 601 907 A2, and is illustrated in FIG. 1 (this figure corresponds to FIG. 2 of the European patent application referred to). This document shall hereinafter be called the document D2.

The basic operation, called a $P_{field}$ operation, consists of the production, on the basis of three binary data elements A (multiplicand), B (multiplier) and N (modulo) encoded on an integer of bits n, of a binary data element denoted $P(A, B)_N$ encoded on n bits, such that $P(A, B)_N = A*B*I \bmod N$, with I as a binary data element encoded on n bits such that $I = 2^{-n} \bmod N$. For this purpose, the data elements are considered to be encoded on m words of k bits, with $m*k=n$, and the words of the data elements A and B are given to a multiplication circuit having a series input, a parallel input and a series output. Specialized coprocessors, for example the coprocessor described in the document D2, are capable of carrying out all the conventional modular operations for a given size $n=m*k$ bits. Furthermore, it is possible to use these processors as multipliers of $k*m'$ bits, m' being a positive integer smaller than m. This amounts to stating that it is possible to carry out elementary $P_{field}$ operations on numbers with sizes greater than what can be normally processed by the coprocessor.

It has been seen here above that $P(A, B)_N = A*B*I \bmod N$, where I is in fact an error due to the subdivision into words of k bits. If it is desired to carry out a modular operation, for example a multiplication, it is necessary to eliminate this error term. For this purpose, a $P_{field}$ operation is carried out with an error correction parameter H equal to $2^{2*m*k}$ when N is encoded on m words of k bits. In a coprocessor which may manage all the numbers of $m*k$ bits, there is provided a wired circuit capable of performing this computation at high speed. However, if a size of number greater than the size of the computation registers is used, the computation of this error correction parameter has to be done on a more standard processor by a method that is identical but programmed, and therefore slower.

SUMMARY OF THE INVENTION

The invention proposes the addition of a supplementary register with a size $k*m=K$ in the modular arithmetic coprocessor that will enable the independent performance of the computation of the error correction parameter H for processing operations using a modulo N encoded on a size greater than K. The invention is aimed at achieving the computation of this parameter H by successive subtraction operations at higher speed that in the case of the processor while at the same time enabling said processor to perform other operations during this period.

An object of the invention is a method for producing a binary error correction parameter $H=2^{(m1+m2)*k} \bmod N$ by means of a coprocessor having registers with at most $m*k$ bits, N being a binary data element encoded on m1 words of k bits, m1 being an integer greater than m, m, m2 and k being non-zero integers, the coprocessor comprising a first K1-bit shift register, a second K2-bit shift register, a third K3-bit shift register and a fourth K4-bit shift register, a subtraction circuit, K1, K2, K3 and K4 being integers that are multiples of K and such that $K1+K2=K3+K4=m1*k$, and comparison means wherein said method comprises the following steps:

E1: loading the K1 low-order bits of the modulo N into the first K1-bit register;
loading the K2 immediately higher-order bits of the modulo N into the second K2-bit register, the resetting of the third and fourth registers at 0, the contents of the third and fourth registers being called H(0);

E3: producing and storing of a data element $H'(1)=2*(H(0)-N')$ encoded on K3+K4 bits, the contents of the first and second registers being denoted N', by:
  a rightward shift of the first, second, third and fourth registers, the input of the first register being connected to the output of the second register, the input of the third register being connected to the output of the fourth register,
  the bit-by-bit subtraction of the data elements coming out of the first and third registers in a subtraction circuit,
  a leftward shift of the result by one unit,
  the bit-by-bit comparison of H'(1) with N' using comparison means,
  the storage of H'(1) in the third and fourth registers, E4: the setting up of a loop indexed by an index i, with i varying from 2 to $m2*k+1$:
  if $H'(i-1)<N'$, then loading, into the third and fourth registers, $H'(i)=2*H'(i-1)$ obtained by a leftward shift by one unit of $H'(i-1)$ and the bit-by-bit comparison of $H'(i)$ with N',
  else the bit-by-bit subtraction of N' and $H'(i-1)$ in the subtraction circuit and then a leftward shift, by one unit, of the result and the loading, into the third and fourth registers, of the result $H'(i)=2*(H'(i-1)-N')$ and the bit-by-bit comparison of $H'(i)$ with N'.

The method can also be extended to cases where L high-order bits of N are equal to 0, L being a positive or zero integer smaller than k, by modifying the index i of the step E4 which varies from 2 to $m2*k+L+1$. It is also possible in this case to add the following steps:

E2: a leftward shift by L bits of the contents of the first and second registers,
E5: a leftward shift by L bits of the contents of the third and fourth registers.

The fact of using a single additional K-bit register costs less in terms of silicon surface area then doubling the size of three main K-bit registers and enables a considerable gain in speed to compute H despite the use of a number with the size twice that which is normally processed in the coprocessor.

Following the same idea, the invention also proposes a modular arithmetic coprocessor working on registers of k and m*k =K bits, wherein said coprocessor comprises a specific circuit for the computation of an error correction parameter $H=2^{2*K+K'} \bmod N$, where H and N are encoded on one and the same number of bits greater than K.

One feature of a specific circuit of this kind is that it comprises:

- a first K-bit shift register designed to receive the K low-order bits of N,
- a second K-bit shift register designed to receive the K high-order bits of N,
- a third K-bit shift register designed to receive the K low-order bits of an intermediate result,
- a fourth K-bit shift register designed to receive the K high-order bits of the intermediate result,
- a first subtraction circuit,
- comparison means suited for the comparison of the result of the subtraction with the contents of said first and second registers, said comparison means comprising a second subtraction circuit, a delay circuit and a storage circuit.

BRIEF DESCRIPTION OF THE DRAWINGS

The invention will be understood more clearly and other advantages shall appear from the following description, made with reference to the appended drawings, of which.

DETAILED DESCRIPTION

FIG. 1 shows a modular arithmetic coprocessor.

It comprises:

three shift registers 10, 11 and 12 with series input and output. Each of these registers has one and the same number of cells, with K=m*k. These registers may be capable of being subdivided, for example into registers of K/2 cells and into registers of k bits for the registers 10 and 12;

multiplexers 13, 14 and 15 are placed respectively before the registers 10, 11 and 12.

Multiplexers will also be placed before the subdivisions of said registers 10, 11 and 12 if these exist;

three registers 16, 17 and 18 each comprising k cells. The registers 16, 17 and 18 are registers with parallel outputs and series input;

two multiplication circuits 19 and 20 each comprising a series input, a parallel input and a series output. The parallel input of the multiplication circuit 19 is connected to the output of the register 16 by means of a storage flip-flop circuit 21 with k cells. The parallel input of the multiplication circuit 20 is connected to one of the outputs of the registers 17 or 18, by means of a storage flip-flop circuit 22 with k cells. This flip-flop circuit 22 is itself connected to one of the outputs of the registers 17 and 18 by means of a multiplexer with two parallel inputs and one parallel output;

multiplexers 24, 25, 26, 36, 37 and 38;

a demultiplexer 39;—series subtraction circuits 27, 28 and 29;

series addition circuits 30 and 31;

delay circuits 32, 33 and 34 to delay the propagation of binary data elements by k cycle periods;

a circuit 35 for the storage of comparison results.

For greater detail, reference may be made to the document D2 and especially to FIGS. 2 and 3, and to the extracts from the description pertaining thereto: page 15, line 54 to page 16, line 13, and page 17, line 50 to page 18, line 55.

Figure 2:
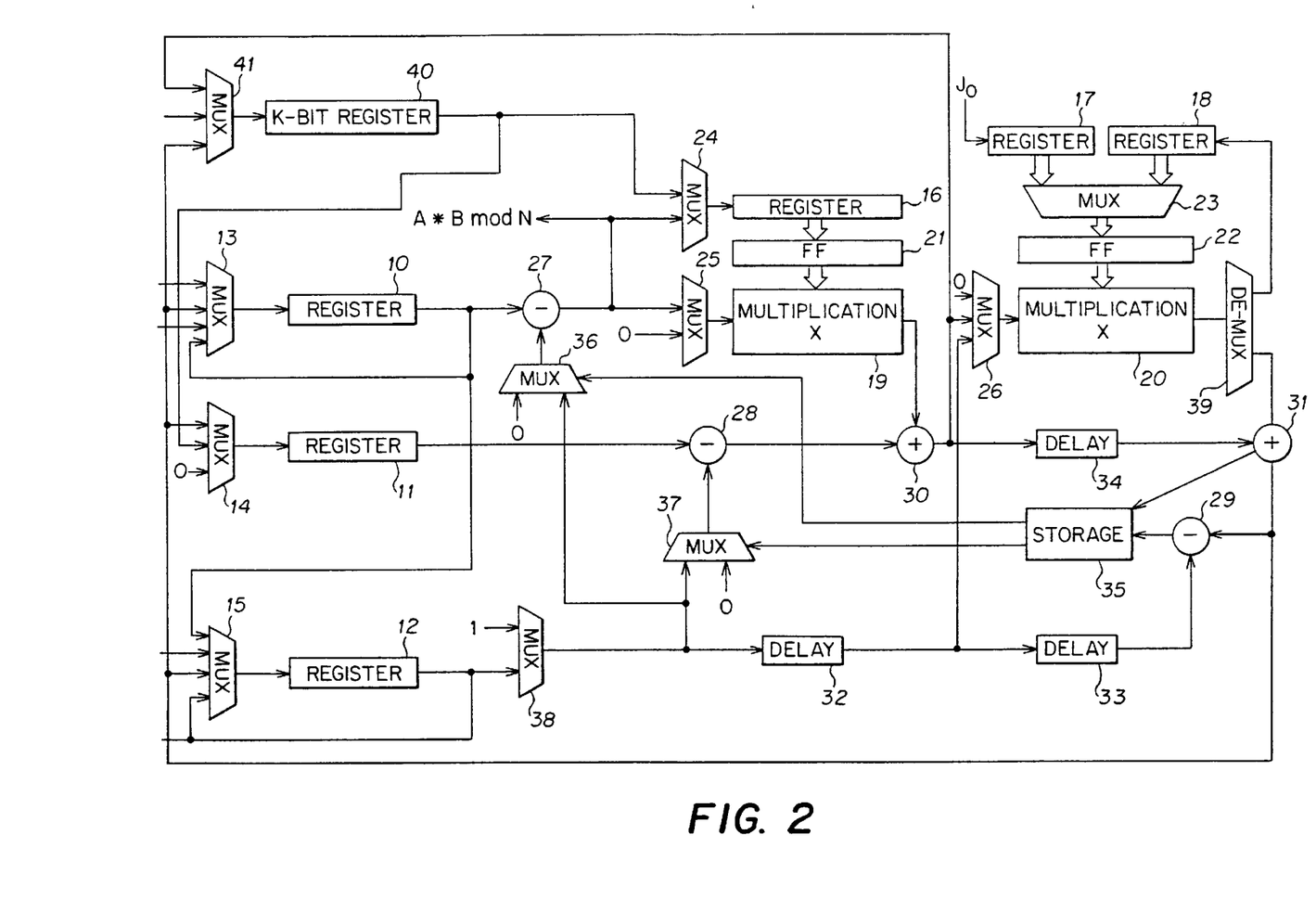
FIG. 2 shows a coprocessor modified according to the invention.

To obtain the invention, modifications have been made to the coprocessor of FIG. 1. Since several embodiment are possible, we have shown a preferred embodiment designed for the addition to said coprocessor of as few elements as possible. Thus FIG. 2 shows the following added elements:

a K-bit register 40 having one output connected to the multiplexer 24, this register 40 being used in an accessory manner as a buffer with a data element A during modular operations; for this specific feature which is not developed in the present document, it would be appropriate for this register 40 to be capable of being subdivided into registers with a size that is a multiple of k bits (the same will be the case for the other registers 10, 11 and 12), a multiplexer 41 with three inputs and one output, the output of this multiplexer 41 being connected to the input of the register 40.

Modifications of certain elements of FIG. 1 have also been made in order to reduce the computation time. Thus, the delay circuits 32, 33 and 34 have a mode of operation where the delay that they give rise to is zero. Other connections have been added in FIG. 2 to certain elements. Those skilled in the art will have no difficulty in perceiving the similarity between the connections of FIG. 2 and those of FIG. 3 which show the same coprocessor in a simplified way. To obtain the drawing of FIG. 3, it is enough for the multiplexers 25 and 26 to be positioned at the input connected to a logic level 0.

Figure 3:
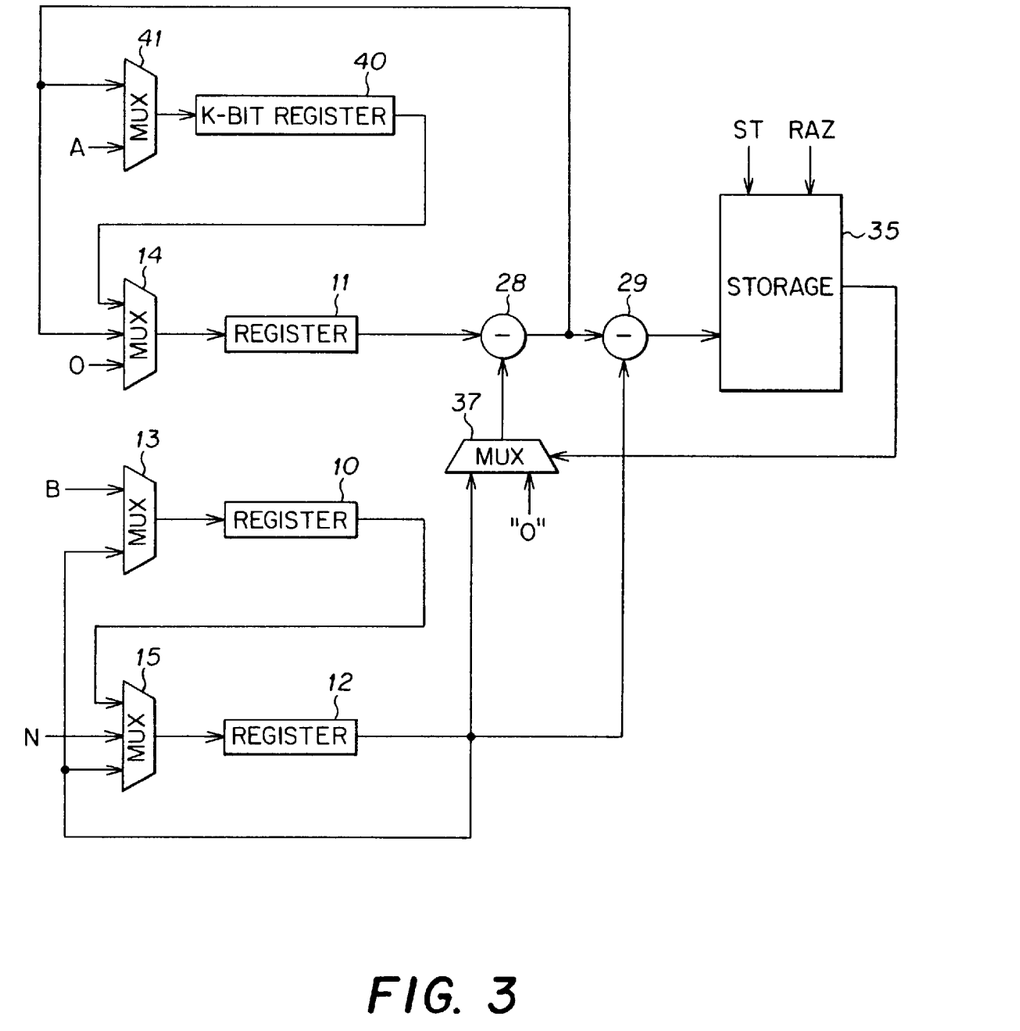
FIG. 3 shows this same coprocessor in a simplified manner.

FIG. 3 which has fewer elements makes it easier to understand the working of the invention. Indeed, the circuit of FIG. 2 may perform the same functions as the circuit of FIG. 1, namely the $P_{field}$ operation, modular multiplication, modular exponentiation or the like. These functions are not described in the present patent application as they are already known. The description will therefore be devoted solely to the method of the invention for which FIG. 3 is quite satisfactory. Those skilled in the art will have no difficulty in transposing the explanations of operation pertaining to FIG. 3 to the drawing of FIG. 2. Thus, the circuit of FIG. 3 comprises:

four K-bit shift registers 10, 11, 12 and 40 having one input and one series output, the least significant bit being positioned towards the output which, during a rightward shift, amounts to bringing in a new most significant bit and "taking out" the former least significant bit, four multiplexers 13, 14, 15 and 41 having their outputs respectively connected to the inputs of the registers 10, 11, 12 and 40, the output of the register 12 being connected to first inputs of the multiplexers 13 and 15, the output of the register 10 being connected to a second input of the multiplexer 15, the output of the register 40 being connected to a first input of the multiplexer 14, a second input of the multiplexer 14 being connected to a logic zero, a second input of the multiplexer 13 being connected to an input terminal B, a third input of the multiplexer 15 being connected to an input terminal N, a first input of the multiplexer 41 being connected to an input terminal A, the selection inputs of these multiplexers 13, 14, 15 and 41 being not shown, another multiplexer 37 having two signal inputs and one selection input and one output, the first input being connected to a logic 0, the second input being connected to the output of the register 12, two subtraction circuits 28 and 29 having two inputs and one series output, the first input of the circuit 28 being connected to the output of the register 11, the second input of the circuit 28 being connected to the output of the multiplexer 37, the output of the circuit 28 being connected to a second input of the multiplexer 14 and a third input of the multiplexer 41, the first input of the circuit 29 being connected to the output of the register 12, the output of the circuit 28 being connected to the first input of the circuit 29, a storage circuit 35 having one signal input, one zero-setting input, one storage input and one output, the signal input being connected to the output of the circuit 29, the output being connected to the selection input of the multiplexer 37, the zero-setting input being connected to a signal RAZ, the storage input receiving a signal ST.

Those skilled in the art will note that the storage circuit 35 and the subtraction circuit 29 constitute means of comparison between twice the result of the subtraction circuit 28 and the contents of the registers 12 and 10. Indeed, the subtraction circuits 28 and 29 prompt delays of one clock cycle each. The fact of performing the two operations of subtraction simultaneously amounts to considering a leftward one-bit shift at output of the subtraction circuit 28, which also corresponds to a multiplication by two.

Certain connections have deliberately been omitted in order to simplify the diagram. Thus, without distinction, elements will be chosen that work synchronously in using one and the same clock signal or else it will be preferred to have elements that work asynchronously in order to obtain a silicon surface area that is as small as possible. In both cases, rightward shift signals will be used for the registers 10, 11, 12 and 40. For a leftward shifts, a complementary number of rightward shifts will be used. It is also possible to use registers capable of carrying out two-way shifts but these will have a greater size.

For the rest of the description, the connections that are indicated correspond to different positions of the multiplexers. Those skilled in the art could then note the different positions to be taken to obtain the synchronization of the coprocessor.

To obtain the computation of an error correction parameter $H=2^{4*K}$ mod N in the case of a multiplication of $A*B$ mod where A, B and N are encoded on $2*K$ bits, the most significant bit of N being equal to 1, with a circuit of this kind, it will be appropriate to perform the at following steps:

E1: loading and resetting:
  the loading of the K low-order bits of the modulo N into the register 12, the loading of the K high-order bits of the modulo N into the register 10, the loading of these registers 10 and 12 possibly being done simultaneously by means of input terminals B and N or in series from the input terminal B,
  the resetting of the registers 11 and 40 at 0, this resetting being done possibly by means of an input for the setting of the registers 11 and 40 or by the propagation of a 0 in these registers 11 and 40 during the loading of the registers 10 and 12, the contents of the registers 11 and 40 being called H(0),
  the resetting of the other elements of the coprocessor, in placing the carry values of the subtraction circuits 28 and 29 at zero by setting the storage circuit 35 at zero by means of the signal RAZ;

E2: the production and storage of a data element $H(1)=2*(H(0)-N)$ encoded on $2*K$ bits by:
  a rightward shift by $2*K$ bits of the four registers 10, 11, 12 and 40, the input of the register 12 being connected to the output of the register 10, the input of the register 11 being connected to the output of the register 40,
  the bit-by-bit subtraction of the data elements coming out of the registers 11 and 12, corresponding to the subtraction H(0)–N,
  a leftward shift of the result by one unit, corresponding to a multiplication by two, a leftward shift being fictitious, the least significant value of the register 11 thus becoming a logic zero (the logic zero coming from the resetting of the subtraction circuit 28),
  the bit-by-bit comparison of H(1) with N during the rightward shifts, the comparison being done through comparison means,
  the storage of H(1) in the registers 11 and 40;

E3: the setting up of a loop indexed by an index i, with i varying from 2 to $2*K+1$:
  the generation of the signal ST at the start of each loop in order to store the previous comparison in the storage circuit 35 and reset the subtraction circuits 28 and 29 at zero,
  if H(i–1)<N, then the loading into the registers 11 and 40 of $H(i)=2*H(i-1)$ obtained by a leftward shift of H(i–1) by one unit, after having obtained a shift by $2*K$ bits to enable a bit-by-bit comparison of H(i) with N,
  else the bit-by-bit subtraction of N and H(i–1) by a rightward shift by $2*K$ bits then a leftward shift of the result by one unit and the loading, into the third and fourth registers, of the result $H(i)=2*(H(i-1)-N)$, and the bit-by-bit comparison of H(i) with N;

E4: the output of the result by an output terminal.

The output terminal used to bring out the result may be the one located at output of the register 10. In this case, it is possible to gain time by loading H(K) into the register 10 in order to be able to bring it out without having to perform a complete shift.

To obtain the comparison of H(i) and N, many circuits and many methods are available. In the preferred method, the following procedure is used:
  the multiplication by two of the result coming out of the subtraction circuit 28 by a one-cycle delay and the addition of a zero to this subtraction circuit 28, the signal ST resetting the contents of the subtraction circuit 28 at each end of a comparison,
  the subtraction of N from H(i) by means of the subtraction circuit 29,
  the carry value of the subtraction being stored by the storage circuit at each dispatch of a signal ST.

The full performance of this method of computation of error correction parameters uses $(2*K)^2$ clock cycles in performing the greatest number of operations simultaneously, using a synchronous clock for all the elements. For K=512, this represents slightly more than one million clock cycles.

A method of this kind can be applied in fact only to modulo N values encoded on $2*K$ bits, the most significant bit of which is equal to one. However, it is quite possible to extend the method for cases where the modulo N value is encoded on a size lower than 2*K bits having the most significant bit equal to one. However, if the modulo N has a size smaller than K bits, it is preferable to use another method that is better suited to a smaller size and is therefore faster. It is quite possible, for example, to obtain the same method by using registers divided into two. This makes it possible to divide the performance time by about four.

To enable the extension of the method to a modulo N value with a size 2*K, N having its L most significant bits equal to 0, L being equal to K, the method is modified as follows:

E1: loading and resetting:
  the loading of the K low-order bits of the modulo N into the register 12, the loading of the K high-order bits of the modulo N into the register 10, the loading of these registers 10 and 12 possibly being done simultaneously by means of input terminals B and N or in series from the input terminal B,
  the resetting of the registers 11 and 40 at 0, this resetting being done possibly by means of an input for the setting of the registers 11 and 40 or by the propagation of a 0 in these registers 11 and 40 during the loading of the registers 10 and 12, the contents of the registers 11 and 40 being called H'(0),
  the resetting of the other elements of the coprocessor, in placing the carry values of the subtraction circuits 28 and 29 at zero by setting the storage circuit at zero by means of the signal RAZ;

E2: a leftward shift by L bits of the registers 10 and 12, the contents of these registers being hereinafter called N' this operation corresponding to a multiplication by $2^L$.

E3: the production and storage of a data element H'(1)= 2*(H'(0)−N') encoded on 2*K bits by:
  a rightward shift by 2*K bits of the four registers 10, 11, 12 and 40, the input of the register 12 being connected to the output of the register 10, the input of the register 11 being connected to the output of the register 40,
  the bit-by-bit subtraction of the data elements coming out of the registers 11 and 12, corresponding to the subtraction H'(0)−N',
  a leftward shift of the result by one unit, corresponding to a multiplication by two, a leftward shift being fictitious, the least significant value of the register II thus becoming a logic zero,
  the bit-by-bit comparison of H'(1) with N' during the rightward shifts and leftward shifts, the comparison being done by means of the subtraction circuit 29 and the storage circuit 35,
  the storage of H'(1) in the registers 11 and 40;

E4: the setting up of a loop indexed by an index i, with i varying from 2 to 2*K+L+1:
  the generation of the signal ST at the start of each loop in order to store the previous comparison in the storage circuit 35 and reset the subtraction circuits 28 and 29 at zero,
  if H'(i−1)<N', then the loading into the registers 11 and 40 of H'(i)=2*H'(i−1) obtained by a leftward shift of H'(i−1) by one unit, after having obtained a shift by 2*K bits to enable a bit-by-bit comparison of H'(i) with N,
  else the bit-by-bit subtraction of N' and H'(i−1) by a rightward shift by 2*K bits then a leftward shift of the result by one unit and the loading, into the third and fourth registers, of the result H'(i)=2*(H'(i−1)−N'), and the bit-by-bit comparison of H'(i) with N';

E5: a rightward shift by 2*K−L bits, this shift corresponding to a division by 2L in disregarding the 2*K−L low-order bits of the last result, and output of the result H by an output terminal.

The step E2 may be performed in fact in two different ways. It is possible to replace the L-bit leftward shift with a rightward shift by *K+1−L bits. It is also possible to merge this step with the step E1 in order to perform it during the loading of the data element. This means that L times followed by K−L low-order bits of N are loaded into the register 12 and the K higher-order bits of N are loaded into the register 10.

The shift done in the step E5 can also be merged with the output of H. It is enough, in this case, to disregard the L first bits that come out of the coprocessor.

A method of this kind uses a total number of clock cycles of (2*K+L)*(2*K) in performing the maximum number of operations simultaneously.

The different computations of H that have been developed here above cover only particular cases where A and B are encoded on 2*K bits. In fact, if these data elements have a size smaller than 2*K bits, it is still possible to reduce the operation to 2*K bits. Optimized computation methods can be used to carry out a number of iterations of the Montgomery method that depends on the real size of the different operands A, B and N. The fact of changing the number of iterations used by the Montgomery method modifies the associated error. In all cases that can be envisaged, there is an error correction parameter $H=2^x$ mod N, x being an integer. Since the invention uses registers of a variable size that is a multiple of k bits, the error is always a power of $2^k$ mod N. A generalization of the method is possible for N encoded on m1*k bits having L high-order bits equal to 0, L being a positive integer lower than k, $H=2^{(m1+m2)*k}$ mod N, m1 being an integer greater than m and m2 being a non-zero positive integer. Thus, the register 12 must be considered as a K1-bit register, the register 10 must be considered as a K2-bit register, the register 11 must be considered as a K3-bit register, the register 40 must be considered as a K4-bit register. K1, K2, K3, K4 are integers that are multiples of k such that K1+K2=K3+K4=m1*k.

The generalized method comprises the following steps:

E1: loading and resetting:
  the loading of the K1 low-order bits of the modulo N into the K1-bit register 12, the loading of the K2 immediately higher-order bits of the modulo N into the K2-bit register 10, the resetting of the registers 11 and 40 at 0, the contents of the registers 11 and 40 being called H(0), E2: a leftward shift by L bits of the contents of the registers 10 and 12, the contents of these registers 10 and 12 being referenced N'.

E3: the production and storage of a data element H'(1)= 2*(H'(0)−N') encoded on K3+K4 bits by:
  a rightward shift of the registers 10, 11, 12 and 40, the input of the register 12 being connected to the output of the register 10, the input of the register 11 being connected to the output of the register 40,
  the bit-by-bit subtraction of the data elements coming out of the registers 11 and 12 in a subtraction circuit 28,
  a leftward shift of the result by one unit,
  the bit-by-bit comparison of H'(1) with N' by means of comparison means 29 and 35, E4: the setting up of a loop indexed by an index i, with i varying from 2 to m2*k+L+1:

if H'(i−1)<N', then the loading into the registers 11 and 40 of H'(i)=2*H'(i−1) obtained by a leftward shift of H'(i−1) by one unit and bit-by-bit comparison of H'(i) with N', else the bit-by-bit subtraction of N' and H'(i−1) in the subtraction circuit 28, then a leftward shift of the result by one unit and the loading, into the registers 11 and 40, of the result H'(i)=2*(H'(i−1)−N'), and the bit-by-bit comparison of H'(i) with N';

E5: a leftward shift by L bits of the contents of the registers 11 and 40,

E6: output of the result H contained in the registers 11 and 40.

With regard to the modalities of carrying out this method, they are the same as those used here above.

Certain observations need to be made.

The step E2 may be merged with the step E1, that is: during the loading of N, the loading is carried out firstly of L times 0 and then of the data element N. It is also possible to perform K1+K2+1−L rightward shifts instead of L leftward shifts. This step E2 furthermore is not necessary when L=0. Similarly, the step E5 can be done at the output of H during the step E6. For this purpose, it is enough to disregard the L first bits that come out. Furthermore, this step is unnecessary if L=0. Should L=0, it is possible to eliminate L throughout the method.

The output step E6 is not obligatory if it is desired to use H in the coprocessor immediately after its production.

Since a basic concept of the invention resides in the implementation of a fourth K-bit register, those skilled in the art could easily find other variants of the arrangement without departing from the general idea of the invention. Indeed, an embodiment has been preferred that has the advantage of requiring few modifications as compared with the coprocessor shown in FIG. 1. However, it is also possible to adapt an embodiment using other common resources.

It will be noted that the connections of the output of the circuit 29 to the third input of the multiplexer 14 and also the output of the register 12 to the second input of the multiplexer 13 enables the registers 40 and 10 to be shunted. These shunted registers permit the performance of the same method applied to modulo N values with sizes smaller than N by using only two of the four registers.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for producing a binary error correction parameter $H=2^{(m1+m2)*k} \mod N$ by means of a coprocessor having registers with at most m*k bits, N being a binary data element encoded on m1 words of k bits, m1 being an integer greater than m, m, m2 and k being non-zero integers, the coprocessor comprising a first K1-bit shift register, a second K2-bit shift register, a third K3-bit shift register and a fourth K4-bit shift register, a subtraction circuit, K1, K2, K3 and K4 being integers that are multiples of k and such that K1+K2=K3+K4=m1*k, and comparison means wherein said method comprises the following steps:

E1: loading the K1 low-order bits of the modulo N into the first K1-bit register, loading the K2 immediately higher-order bits of the modulo N into the second K2-bit register, the resetting of the third and fourth registers at 0, the contents of the third and fourth registers being called H(0);

E3: producing and storing a data element H'(1)=2*(H(0)−N') encoded on K3+K4 bits, the contents of the first and second registers being denoted N', by:

a rightward shift of the first, second, third and fourth registers, the input of the first register being connected to the output of the second register, the input of the third register being connected to the output of the fourth register, the bit-by-bit subtraction of the data elements coming out of the first and third registers in a subtraction circuit;

a leftward shift of the result by one unit;

the bit-by-bit comparison of H'(1) with N' using comparison means;

the storage of H'(1) in the third and fourth registers;

E4: setting up a loop indexed by an index i, with i varying from 2 to m2*k+1:

if H'(i−1)<N', then loading, into the third and fourth registers, H'(i)=2*H'(i−1) obtained by a leftward shift by one unit of H'(i−1) and the bit-by-bit comparison of H'(i) with N';

else the bit-by-bit subtraction of N' and H'(i−1) in the subtraction circuit and then a leftward shift, by one unit, of the result and the loading, into the third and fourth registers, of the result H'(i)=2*(H'(i−1)−N') and the bit-by-bit comparison of H'(i) with N'.

2. A method according to claim 1, wherein the L high-order bits of N are equal to 0, L being a positive or zero integer smaller than k, wherein the index i of the step E4 varies from 2 to m2*k+L+1.

3. A method according to claim 2, comprising the following steps:

E2: a leftward shift by L bits of the contents of the first and second registers; and E5: a leftward shift by L bits of the contents of the third and fourth registers.

4. A method according to claim 1, wherein the output of the first register is connected to the input of the second register during the steps E3 and E4.

5. A method according to claim 1, wherein the loading of the first and second registers is done simultaneously by using two input terminals, each of the inputs of said registers being connected to one of the input terminals.

6. A method according to claim 1, wherein the loading of the first and second registers is done simultaneously by using one input terminal, the output of the second register being connected to the input of the first register, the input of the second register being connected to the input terminal.

7. A method according to claim 1, wherein the first, second, third and fourth registers are of variable size and wherein their maximum size is m*k bits.

8. A method for producing a binary error correction parameter $H=2^{(m1+m2)*k} \mod N$ by means of a coprocessor having registers with at most m*k bits, N being a binary data element encoded on m1 words of k bits, m1 being an integer greater than m, m, m2 and k being non-zero integers, the coprocessor comprising a first K1-bit shift register, a second K2-bit shift register, a third K3-bit shift register and a fourth K4-bit shift register, a first and second subtraction circuits, K1, K2, K3 and K4 being integers that are multiples of k and such that K1+K2=K3+K4=m1*k, and comparison means wherein said method comprises the following steps:

E1: loading and resetting:

the loading of the K1 low-order bits of the modulo N into the K-bit first register, the loading of the K2 immediately higher-order bits of the modulo N into the K-bit second register, the resetting of the third and fourth registers at 0, the contents of the third and fourth registers being called H(0), E2: a leftward shift by L bits of the contents of the first and third registers, the contents of the first and second registers being referenced N'

E3: the production and storage of a data element H'(1)= 2*(H'(0)−N') encoded on K3+K4 bits by:
  a rightward shift of the registers, the input of the first register being connected to the output of the second register, the input of the third register being connected to the output of the fourth register,
  the bit-by-bit subtraction of the data elements coming out of the third and first registers in the first subtraction circuit,
  a leftward shift of the result by one unit,
  the bit-by-bit comparison of H'(1) with N' by means of comparison means, E4: the setting up of a loop indexed by an index I, with I varying from 2 to m2*k+L+1:
  if H'(I−1)<N', then the loading into the third and fourth registers of H'(I)=2*H'(I−1) obtained by a leftward shift of H'(I−1) by one unit and bit-by-bit comparison of H'(I) with N',
  else the bit-by-bit subtraction of N' and H'(I−1) in the subtraction circuit, then a leftward shift of the result by one unit and the loading, into the third and fourth registers, of the result H'(I)=2*(H'(I−1)−N'), and the bit-by-bit comparison of H'(I) with N';

E5: a leftward shift by L bits of the contents of the third and fourth registers, E6: output of the result H contained in the third and fourth registers.

9. The method according to claim 8 wherein the step E2 is merged with step E1, that is: during the loading of N, the loading is carried out firstly of L times 0 and then of the data element N.

10. The method according to claim 9 including performing K1+K2+1−L rightward shifts instead of L leftward shifts.

11. The method according to claim 10 wherein the E5 is done at the output of H during the step E6.

12. In a coprocessor apparatus comprising:
  a first register;
  a second register;
  a third register
  at least one input terminal coupled to these registers to receive data to be stored in these registers;
  a multiplication circuit enabling the performance of a multiplication operation with data from at least said first register;
  a first multiplexer;
  a second multiplexer;
  a third multiplexer;
  means connecting each multiplexer to its corresponding register;
  a circuit for the storage of comparison results;
  wherein the improvement comprises;
  a fourth register having its output coupled to the multiplication circuit;
  and a fourth multiplexer having multiple inputs and one output, the output of the fourth multiplexer being connected to the input of the fourth register.

13. In a coprocessor apparatus according to claim 12 wherein the fourth multiplexer has three inputs and the output of the fourth register coupled to one input of the second multiplexer.

14. In a coprocessor apparatus according to claim 13 including a fifth multiplexer coupled between the fourth register and the multiplication circuit.

15. In a coprocessor apparatus according to claim 14 including an addition circuit enabling the performance of an additional operation between data stored in the second register and data produced by the multiplication circuit.

16. In a coprocessor apparatus according to claim 15 wherein the output of the addition circuit couples to one input of the fourth multiplexer.

17. A coprocessor circuit comprising:
  four registers each having one input and one series output;
  four multiplexers having their outputs respectfully connected to the inputs of the four registers;
  another multiplexer having two signal inputs and one selection input and one output, the second input being connected to the output of the third register;
  two subtraction circuits having two inputs and one series output;
  the two subtraction circuits being connected in series to the output of the first register;
  a storage circuit having one signal input and one output the signal input being connected to the output of the second subtraction circuit, the output being connected to the selection input of said another multiplexer.

18. In a coprocessor apparatus according to claim 17 wherein the output of the third register is connected to first inputs of the second and third multiplexers.

19. In a coprocessor apparatus according to claim 18 wherein the output of the first register is connected to a second input of the third multiplexer.

20. In a coprocessor apparatus according to claim 19 wherein the output of the fourth register is connected to a first input of the second multiplexer, a second input of the second multiplexer being connected to a logic zero.

21. In a coprocessor apparatus according to claim 20 wherein a second input of the first multiplexer is connected to an input terminal B, a third input of the third multiplexer is connected to an input terminal N, a first input of the fourth multiplexer is connected to an input terminal A.

22. In a coprocessor apparatus according to claim 21 wherein said another multiplexer has two single inputs and one selection input and one output, the first input being connected to a logic zero and the second input being connected to the output of the third register.

23. In a coprocessor apparatus according to claim 22 wherein the first input of the first subtraction circuit is connected to the output of the second register, the second input of the first subtraction circuit is connected to the output of said another multiplexer, the output of the first subtraction circuit being connected to the second input of the second multiplexer and a third input of the fourth multiplexer, the first input of the second subtraction circuit being connected to the output of the third register, the output of the first subtraction circuit being connected to the first input of the second subtraction circuit.

24. In a coprocessor apparatus according to claim 23 wherein the storage circuit has one single input, one zero setting input, one storage input and one output, the single input being connected to the output of the second subtraction circuit, the output being connected to the selection input of said another multiplexer the zero setting input being connected to a signal RAZ and the storage input receiving a signal ST.

* * * * *

UNITED STATES PATENT AND TRADEMARK OFFICE
CERTIFICATE OF CORRECTION

PATENT NO.  : 5,912,904
DATED       : June 15, 1999
INVENTOR(S): Guy Monier

It is certified that error appears in the above-identified patent and that said Letters Patent is hereby corrected as shown below:

On the title page, item [75] should read:

[75]   Inventor:      Guy Monier, Rognac, France

Signed and Sealed this

Twenty-eighth Day of December, 1999

*Attest:*

Q. TODD DICKINSON

*Attesting Officer*   *Acting Commissioner of Patents and Trademarks*